March 24, 1931.  W. F. DEHUFF  1,797,466
AUXILIARY SWITCH MEMBER
Filed June 2, 1930
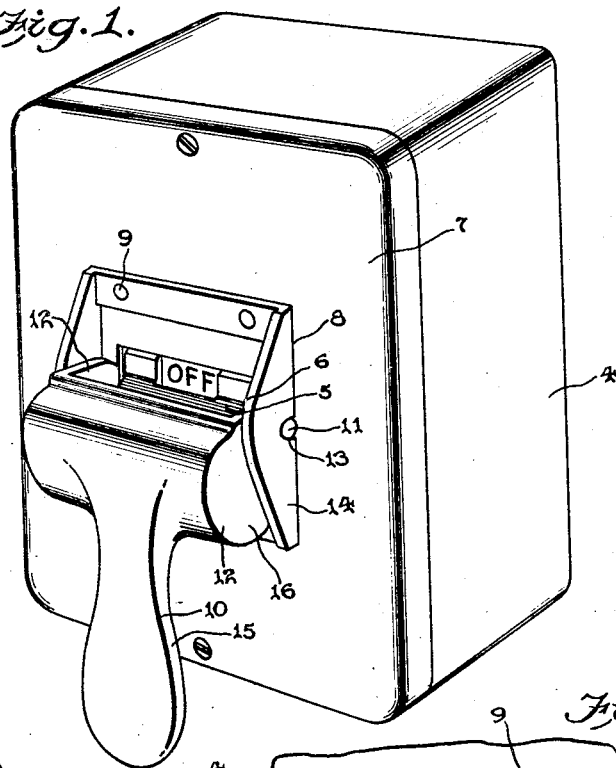
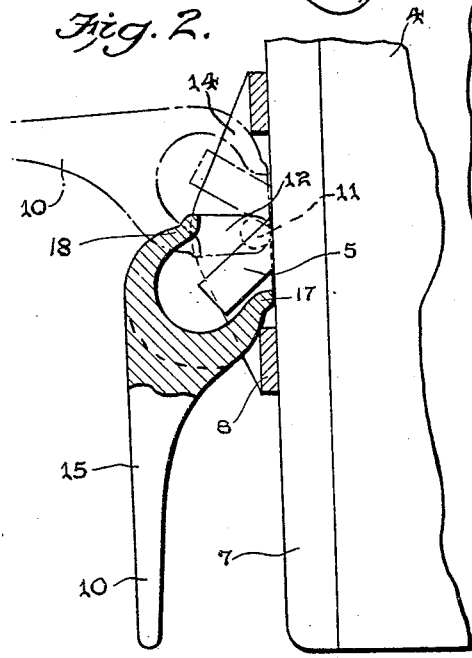
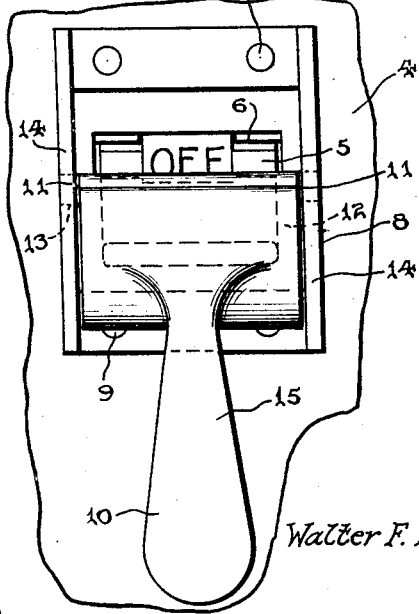
Inventor
Walter F. De Huff,
By
Mason, Fenwick & Lawrence
Attorneys Patented Mar. 24, 1931

1,797,466

UNITED STATES PATENT OFFICE

WALTER F. DEHUFF, OF GLEN ROCK, PENNSYLVANIA

AUXILIARY SWITCH MEMBER

Application filed June 2, 1930. Serial No. 458,949.

This invention relates to auxiliary handles adapted to be used in connection with quick make and break switches of the usual type; and more particularly adapted to be used in connection with dough mixing apparatus, although not limited to such use.

The prime object of this invention is to provide an attachment in the form of an auxiliary handle that will cooperate with the usual short operating tongue in a quick make and break switch, so as to greatly facilitate the operation of the tongue member. Such an attachment is particularly adapted to be used in connection with dough mixing apparatus. In such use, it is convenient and almost imperative that the position of the agitator in the bowl be regulated or positioned so that the flour and other ingredients can be readily put in the bowl whilst the baker is standing in front of the machine. This means, of course, that some way must be provided so that the positioning of this agitator in the bowl can be readily regulated by the operator. In most of such machines a friction clutch is utilized. This permits the operator to readily control the stopping of the agitator in the desired position in the bowl, but requires more mechanical parts which must be kept in good order, and are given to slipping, thus requiring constant adjustment. Since the major part of a baker's work is done in the midnight hours, it is difficult to make the necessary repairs in connection with said friction clutches—which results in lowered efficiency of the mixing machine and results in smaller batches being produced.

Realizing the objections to the friction clutch, I originally used push button remote control, but owing to the variation in voltages and other objections, I found it impracticable to use this equipment, and decided to use a motor starting switch, which is known in the trade as "across the line switch", operated in the conventional manner with quick make and break switch arrangement. This proved objectionable in that it is almost impossible for the baker to control the position of the agitator in the bowl, as the tongue of the make and break switch must be operated very quickly and skillfully and may be repeated several times in order to properly position the agitator. Add to this the condition of the baker's hands, which are usually covered with grease and dough, and the task becomes almost impossible of solution under the conditions outlined.

By adding my auxiliary operating lever to regulate the quick make and break feature of the switch, and at the same time, provide a long quickly operated lever which permits the baker to control the positioning of the agitator, I find that the positioning of the agitator in the bowl can be accomplished as readily and conveniently as where the conventional friction clutch is used without its objections.

Another object is to provide a handle adapted to give the initial impulse to the tongue of the make and break switch, and yet not interfere or control the movement of the switch after its initial impulse.

Other objects will be disclosed in the specification and claim forming a part of this application.

In the drawings:

Figure 1 is a perspective of a conventional "across the line" switch, showing the auxiliary handle secured thereto;

Figure 2 is a side elevation, partly in section, showing the respective positions of the auxiliary handle in respect to the conventional "across the line" switch; and Figure 3 is a front elevation of the auxiliary handle in operative position, the parts being shown in dotted lines.

Referring to the drawings, in which like parts are designed with similar numerals:

Numeral 4 designates a quick make and break switch of the conventional "across the line" type, having a tongue 5 extending from a slot 6 in the face 7 of the switch 4. The tongue 5 is of the usual construction and is under tension so as to make a quick make and break contact.

A frame member 8 surrounds the slot 6 and is secured to the face 7 of the switch 4 by means of rivets 9, it being obvious that other securing means may be utilized.

An auxiliary member 10 has studs 11 extending from the side walls 12 of the member 10, the studs 10 being positioned in bearings 13 located in side members 14 of the frame 8. The auxiliary member 10 has a handle 15 slightly beveled and shaped to readily conform to the human hand. The handle 10 extends from a housing 16 in which the tongue 5 is adapted to play. An upper and lower lip, 17 and 18 respectively, are formed on the opposite sides 19 of the housing 16.

As actually operated, when it is desired to stop the operation of the machine which the switch 4 controls, the handle 15 will be rotated downwardly, the upper lip 17 coming into contact with the tongue 5 and giving it its initial impulse to cut off the machine. Since the switch is of the make and break type, and the tongue 5 is under tension, the cut off operation will be completed of its own volition. This is highly desirable since this action is much quicker than the manual operation would normally be. By making the housing 16 hollow, this movement of the tongue is possible.

When it is desired to turn the switch on, the handle 15 will be lifted by the operator and the lower lip 18 will contact with the under side of the tongue 5, giving the initial impulse which results in the switch 4 being cut off.

It is obvious that a very positive make and break action is obtained by the auxiliary member 10, and that the same may be operated back and forth very rapidly, if desired, without interfering with the normal operation of the switch 4. By having the handle 15 slightly beveled, a superior fulcrum action is obtained.

Although I have stated my problem as relating particularly to dough mixers, it is obvious that regardless of the problem my invention greatly facilitates the easy use and accuracy of operation of this type of switch.

What I claim is:

A casing having a snap switch enclosed therein and including an operating lever projecting through one side of said casing, a frame secured to said side, a housing pivoted to said frame and extending as a protective cover over and around said lever, and a handle extending from said housing, said housing having lips spaced apart a greater distance than the thickness of said lever and adapted to contact with the adjacent sides of the lever to initiate the snap of the lever from one predetermined position to another.

In testimony whereof I affix my signature.

WALTER F. DEHUFF.